US012768424B2

(12) United States Patent
Yan

(10) Patent No.: US 12,768,424 B2
(45) Date of Patent: Oct. 20, 2026

(54) MULTIPLE DEGREE OF FREEDOM RESPONSE VALVE, VARIABLE DAMPING SHOCK ABSORBER, AND VEHICLE

(71) Applicant: XIAOMI EV TECHNOLOGY CO., LTD., Beijing (CN)

(72) Inventor: Yongfeng Yan, Beijing (CN)

(73) Assignee: XIAOMI EV TECHNOLOGY CO., LTD., Beijing (CN)

( * ) Notice: Subject to any disclaimer, the term of this patent is extended or adjusted under 35 U.S.C. 154(b) by 530 days.

(21) Appl. No.: 18/237,847

(22) Filed: Aug. 24, 2023

(65) Prior Publication Data

US 2024/0376951 A1 Nov. 14, 2024

(30) Foreign Application Priority Data

May 12, 2023 (CN) ........................ 202310540103.6

(51) Int. Cl.
*F16F 9/34* (2006.01)
*B60G 17/08* (2006.01)

(52) U.S. Cl.
CPC ................ *F16F 9/34* (2013.01); *B60G 17/08* (2013.01); *B60G 2500/11* (2013.01)

(58) Field of Classification Search
CPC .... F16F 9/34; F16F 9/504; F16F 17/08; F16F 9/3207; F16F 9/3235; F16F 9/5126; F16F 2222/12; F16F 2228/04; B60G 17/08; B60G 2500/11
See application file for complete search history.

(56) References Cited

U.S. PATENT DOCUMENTS

| | | | | |
|---|---|---|---|---|
| 6,345,705 B1 * | 2/2002 | Tremblay ................ | F16F 9/504 188/266.2 |
| 8,875,852 B2 * | 11/2014 | Bruno ..................... | F16F 9/325 188/282.8 |
| 2022/0381314 A1 * | 12/2022 | Lee ......................... | F16F 9/585 |

FOREIGN PATENT DOCUMENTS

| | | | |
|---|---|---|---|
| FR | 2552184 A1 | 3/1985 |
| JP | H10339346 A | 12/1998 |

OTHER PUBLICATIONS

Chinese Patent No. CN 103711828 to Yang et al published on Apr. 9, 2014.*

(Continued)

*Primary Examiner* — Pamela Rodriguez
(74) *Attorney, Agent, or Firm* — Cozen O'Connor

(57) ABSTRACT

A multiple degree of freedom response valve includes a valve body, a movable member, and at least three elastic members. The movable member is movably connected to the valve body. The movable member has a first liquid guide channel, and the valve body has a second liquid guide channel and a pilot channel. The elastic members are disposed at intervals around an axis of the movable member and each connected at a first end to the movable member and at a second end opposite the first end to the valve body. The elastic members are in a same plane in a radial direction of the movable member, The pilot channel is communicated with the first liquid guide channel, and the movable member is movable with respect to the valve body, so that the first and second liquid guide channels are able to be communicated or uncommunicated.

20 Claims, 9 Drawing Sheets

(56) References Cited

OTHER PUBLICATIONS

Korean Patent No. KR 20140134423 to Lee published on Nov. 24, 2014.*
French Patent No. FR 3086985 to Allegre et al published on Apr. 10, 2020.*
Chinese Patent Application No. 2023105401036 Office Action dated Apr. 30, 2026 with English translation, 20 pages.

* cited by examiner

MULTIPLE DEGREE OF FREEDOM RESPONSE VALVE, VARIABLE DAMPING SHOCK ABSORBER, AND VEHICLE

CROSS-REFERENCE TO RELATED APPLICATIONS

The present application claims the benefit of priority to Chinese Application No. 202310540103.6, filed on May 12, 2023, the contents of which are incorporated herein by reference in their entireties for all purposes.

BACKGROUND

In the related art, a frequency response valve system or an amplitude response valve system is often used in variable damping shock absorbers to realize variable damping of the shock absorber.

SUMMARY

The present disclosure relates to the field of shock absorbers, and more particularly to a multiple degree of freedom response valve, a variable damping shock absorber, and a vehicle.

A first aspect of the present disclosure provides a multiple degree of freedom response valve. The multiple degree of freedom response valve includes a valve body, a movable member, and at least three elastic members. The movable member is movably connected to the valve body. The movable member has a first liquid guide channel, and the valve body has a second liquid guide channel and a pilot channel. The at least three elastic members are disposed at intervals around an axis of the movable member and each connected at a first end to the movable member and at a second end opposite the first end to the valve body. The at least three elastic members are in a same plane in a radial direction of the movable member. The pilot channel is communicated with the first liquid guide channel, and the movable member is able to move with respect to the valve body, so that the first liquid guide channel and the second liquid guide channel are able to be communicated or uncommunicated. The multiple degree of freedom response valve has an on state and an off state, and the multiple degree of freedom response valve is easier to switch from the off state to the on state when the first liquid guide channel and the second liquid guide channel are at least partially communicated, compared to when the first liquid guide channel and the second liquid guide channel are not communicated.

A second aspect of the present disclosure also provides a variable damping shock absorber. The variable damping shock absorber includes a shock absorber body and a multiple degree of freedom response valve connected to the shock absorber body. The multiple degree of freedom response valve includes a valve body, a movable member, and at least three elastic members. The movable member is movably connected to the valve body. The movable member has a first liquid guide channel, and the valve body has a second liquid guide channel and a pilot channel. The at least three elastic members are disposed at intervals around an axis of the movable member and each connected at a first end to the movable member and at a second end opposite the first end to the valve body The at least three elastic members are in a same plane in a radial direction of the movable member. The pilot channel is communicated with the first liquid guide channel, and the movable member is able to move with respect to the valve body, so that the first liquid guide channel and the second liquid guide channel are able to be communicated or uncommunicated. The multiple degree of freedom response valve has an on state and an off state, and the multiple degree of freedom response valve is easier to switch from the off state to the on state when the first liquid guide channel and the second liquid guide channel are at least partially communicated, compared to when the first liquid guide channel and the second liquid guide channel are not communicated.

A third aspect of the present disclosure also provides a vehicle. The vehicle includes a multiple degree of freedom response valve. The multiple degree of freedom response valve includes a valve body, a movable member, and at least three elastic members. The movable member is movably connected to the valve body. The movable member has a first liquid guide channel, and the valve body has a second liquid guide channel and a pilot channel. The at least three elastic members are disposed at intervals around an axis of the movable member and each connected at a first end to the movable member and at a second end opposite the first end to the valve body. The at least three elastic members are in a same plane in a radial direction of the movable member. The pilot channel is communicated with the first liquid guide channel, and the movable member is able to move with respect to the valve body, so that the first liquid guide channel and the second liquid guide channel are able to be communicated or uncommunicated. The multiple degree of freedom response valve has an on state and an off state, and the multiple degree of freedom response valve is easier to switch from the off state to the on state when the first liquid guide channel and the second liquid guide channel are at least partially communicated, compared to when the first liquid guide channel and the second liquid guide channel are not communicated.

BRIEF DESCRIPTION OF THE DRAWINGS

The accompanying drawings, which are intended to provide further understanding of the present disclosure and constitute a part of this specification, together with the specific embodiments below, serve to explain the present disclosure and cannot be construed as limiting the present disclosure.

DESCRIPTION OF REFERENCE NUMERALS

Figure 1:
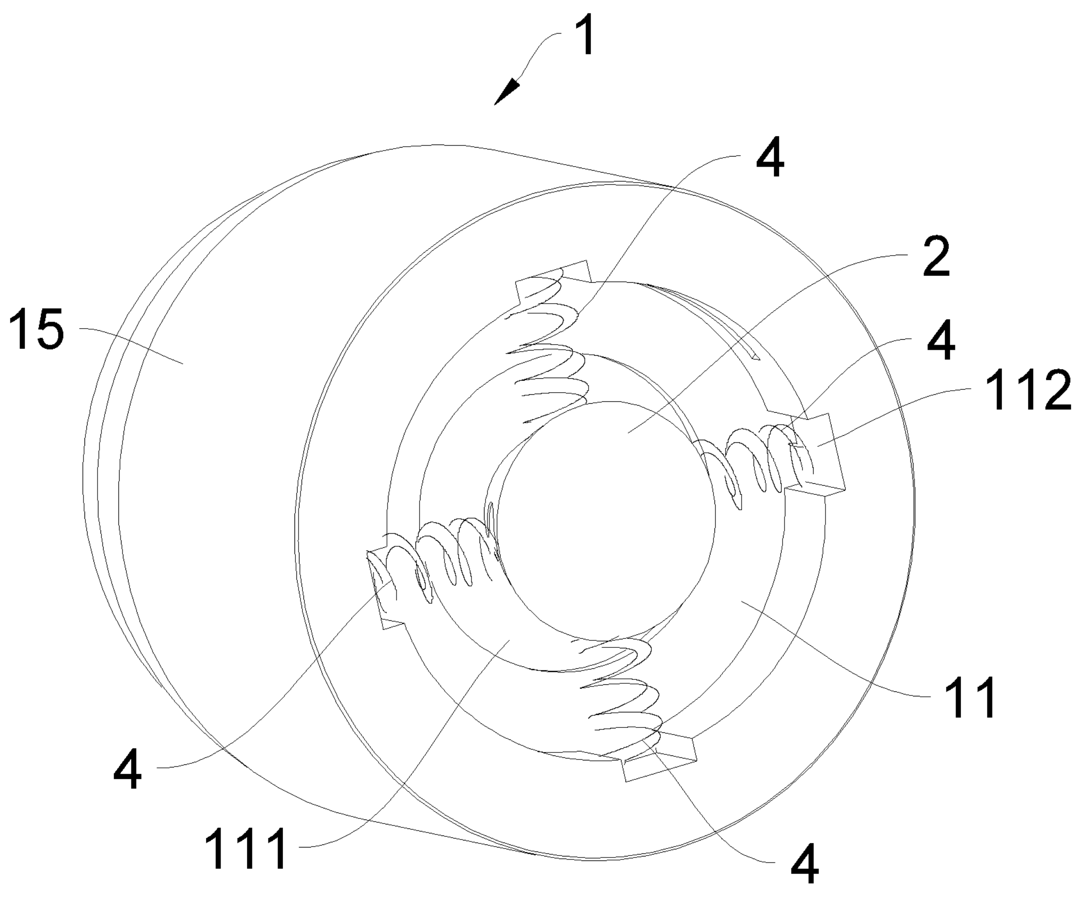
FIG. 1 is a perspective view of a multiple degree of freedom response valve according to an embodiment of the present disclosure.

- a valve body 1, an accommodation groove 11, a limiting groove 111, a first installation groove 112, a third liquid guide hole 12, a fourth liquid guide hole 13, a first liquid guide groove 14, a valve seat 15, a valve port 151, an accommodation cavity 152, a snapping groove 153, a valve cover 16, a liquid inlet 161, a second liquid guide groove 17;
- a movable member 2, a first liquid guide hole 21, a second liquid guide hole 22, a second installation groove 23;
- a valve core 3, a communicating hole 31;
- an elastic member 4;
- a first cylinder 5, first chamber 51, a mounting seat 52, a sealing cover 53, a sealing ring 54;
- a second cylinder 6, a second chamber 61, a through hole 62;
- a third cylinder 7;
- a foot valve 8;
- a reset member 9.

DETAILED DESCRIPTION

Specific embodiments of the present disclosure are described in detail below in combination with the accompanying drawings. It is to be understood that the specific embodiments described herein are merely used to illustrate and explain the present disclosure, and cannot be construed as limiting the present disclosure.

In the present disclosure, unless stated otherwise, directional words used such as "up", "down", "left", and "right" are usually defined by a direction of a drawing surface of the accompanying drawings, and "inner" and "outer" refer to the inside and outside of relevant parts. In addition, terms "first", "second" and so on are merely used to distinguish descriptions, and cannot be understood as indicating or implying relative importance.

In the description of the present disclosure, it is also to be noted that, unless specified or limited otherwise, terms "provided" and "connected" are used broadly, and may be, for example, fixed connections, detachable connections, or integral connections, may also be direct connections or indirect connections via an intermediary, may also be inner communications of two elements. Specific meanings of the above-mentioned terms in the present disclosure may be understood by those skilled in the art according to specific situations.

As a component of a vehicle suspension system, a main function of a shock absorber is to attenuate a vertical motion and vibration of a vehicle, making the vehicle have better riding comfort and handling.

A core of the shock absorber which provides a damping force is a valve system. The traditional solution is one or two passive valve systems in a cylinder shock absorber, and the shock absorber has fixed damping characteristics through the adjustment and matching work in a vehicle development stage.

On the basis of the traditional passive valve system, a frequency response valve system, an amplitude response valve system and the like have been developed at present, so that the damping characteristics of the shock absorber may be adaptively variable according to actual road conditions in work, mainly to solve the problem of vehicle comfort.

The frequency response valve system, using characteristics of pressure buildup delay of the oil in the shock absorber, makes the shock absorber produce small damping under high frequency vibration conditions, and produce large damping under low frequency vibration conditions. There is an obvious frequency boundary point between the large and small damping characteristics, that is, two-stage damping characteristics.

In the amplitude response valve system, when a vibration amplitude of the shock absorber is small, the damping is small, the vibration amplitude increases and the damping becomes larger. There is an obvious amplitude boundary point between the large and small damping characteristics, that is, two-stage damping characteristics.

In the related art, the frequency response valve system or the amplitude response valve system is often used in a variable damping shock absorber to realize variable damping of the shock absorber. However, the valve system may merely realize response adjustment in one direction with limited improvement in driving performance and comfort performance of the vehicle. In addition, the valve system will increase a length of the shock absorber and sacrifice a working stroke of the shock absorber.

In addition, an electronically controlled shock absorber is developed to realize the active variable damping characteristics, which controls the oil flow through a solenoid valve, and then generates a continuously variable damping force depending on a control current of the solenoid valve. Combined with software algorithms, the electronically controlled shock absorber may realize damping change for more road conditions and operating conditions, such as a two-stage or multi-stage damping adjustable electrically controlled shock absorber, a proportional valve type continuous damping adjustable shock absorber, a magnetorheological shock absorber, and an electrorheological shock absorber, etc. However, this kind of shock absorber needs to add components such as additional controllers, sensors, electromagnetic coils, wire harness connectors and the like to become a more complex system to fully realize its value, thus resulting in higher cost.

Therefore, as illustrated in FIGS. 1 to 7, a first aspect of the present disclosure provides a multiple degree of freedom response valve. The multiple degree of freedom response valve includes a valve body 1. a movable member 2. and at least three clastic members 4.

The movable member 2 is movably connected to the valve body 1. The at least three elastic members 4 are disposed at intervals around an axis of the movable member 2 and each connected at a first end to the movable member 2 and at a second end opposite the first end to the valve body 1. The at least three elastic members 4 are in a same plane in a radial direction of the movable member 2. The movable member 2 has a first liquid guide channel, the valve body 1 has a second liquid guide channel and a pilot channel, the pilot channel is communicated with the first liquid guide channel, and the movable member 2 can move with respect to the valve body 1, so that the first liquid guide channel and the second liquid guide channel can be communicated or uncommunicated.

The multiple degree of freedom response valve has an on state and an off state, and the multiple degree of freedom response valve is easier to switch from the off state to the on state when the first liquid guide channel and the second liquid guide channel are at least partially communicated, compared to when the first liquid guide channel and the second liquid guide channel are uncommunicated.

The movable member 2 may move freely in a radial plane, and may move according to different states such as acceleration, deceleration, left-right roll, and simultaneous acceleration and roll, simultaneous deceleration and roll, and the like as the vehicle advances. Due to the free movement of the movable member 2, the first liquid guide channel on the movable member 2 and the second liquid guide channel on the valve body 1 will be completely communicated, partially communicated or uncommunicated. Thus, damping characteristics of a configured shock absorber may be changed.

It may be understood that due to different communication states of the first liquid guide channel and the second liquid guide channel, the pilot channel may guide the oil to overflow in advance, so that the multiple degree of freedom response valve may be changed under two conditions that it is easy to switch from the off state to the on state and it is not easy to switch from the off state to the on state, and a flow rate of oil flowing through the multiple degree of freedom response valve may be changed. Thus, the damping characteristics of the shock absorber may be changed.

It is to be noted that the multiple degree of freedom response valve is easier to switch from the off state to the on state when the first liquid guide channel and the second liquid guide channel are partially communicated, compared to when the first liquid guide channel and the second liquid guide channel are uncommunicated. The multiple degree of freedom response valve is easier to switch from the off state to the on state when the first liquid guide channel and the second liquid guide channel are completely communicated, compared to when the first liquid guide channel and the second liquid guide channel are partially communicated.

The at least three elastic members 4 are disposed at circular intervals around the movable member 2, so that the movable member 2 may be forced to reset no matter where it moves to under the action of the at least three elastic members 4. Therefore, when the vehicle runs smoothly, the first liquid guide channel of the movable member 2 and the second liquid guide channel of the valve body 1 may be completely communicated. Thus, the damping characteristics of the configured shock absorber may be changed, and the driving comfort may be improved.

It is to be noted that a specific moving position of the movable member 2 is influenced by the different states of the vehicle, such as acceleration, deceleration, left-right roll, simultaneous acceleration and roll, and simultaneous deceleration and roll, and the like. For example, when the vehicle is in acceleration roll or deceleration roll, the movable member 2 may move obliquely upward or obliquely downward. At this time, the first liquid guide channel and the second liquid guide channel are partially communicated or uncommunicated. At this time, it is difficult for the multiple degree of freedom response valve to switch from the off state to the on state, which may reduce the oil flow and enhance the damping characteristics of the shock absorber. When the vehicle is running smoothly, the movable member 2 returns to an original position under the action of the at least three elastic members 4. At this time, the first liquid guide channel and the second liquid guide channel are completely communicated. The multiple degree of freedom response valve is easy to switch from the off state to the on state. Thus, the oil may flow normally, and the damping characteristics of the shock absorber remain normal. A specific matching relationship between the movable member 2 and the state of the vehicle may be adjusted and set according to actual needs, which is not restricted herein.

In the above-mentioned technical solution, by providing the at least three elastic members 4, a rebound effect in at least three directions of the movable member 2 in the radial plane may be generated, so that the movable member 2 may move freely in the radial plane. Therefore, the flow rate of the oil flowing through may be adjusted according to the acceleration, deceleration and left-right roll, simultaneous acceleration and roll, and simultaneous deceleration and roll of the vehicle. Thus, the damping characteristics of the configured shock absorber may be adjusted to realize responses in multiple directions, and the driving performance and comfort performance of the vehicle are improved. In addition, the multiple degree of freedom response valve of the present disclosure may be applied based on a traditional passive shock absorber, without designing a structure of the shock absorber separately, with high commonality and easy to manufacture, without sacrificing the stroke of the shock absorber, ensuring a damping effect of the shock absorber, without excessive electronic and electrical components, and without increasing the cost.

Figure 3:
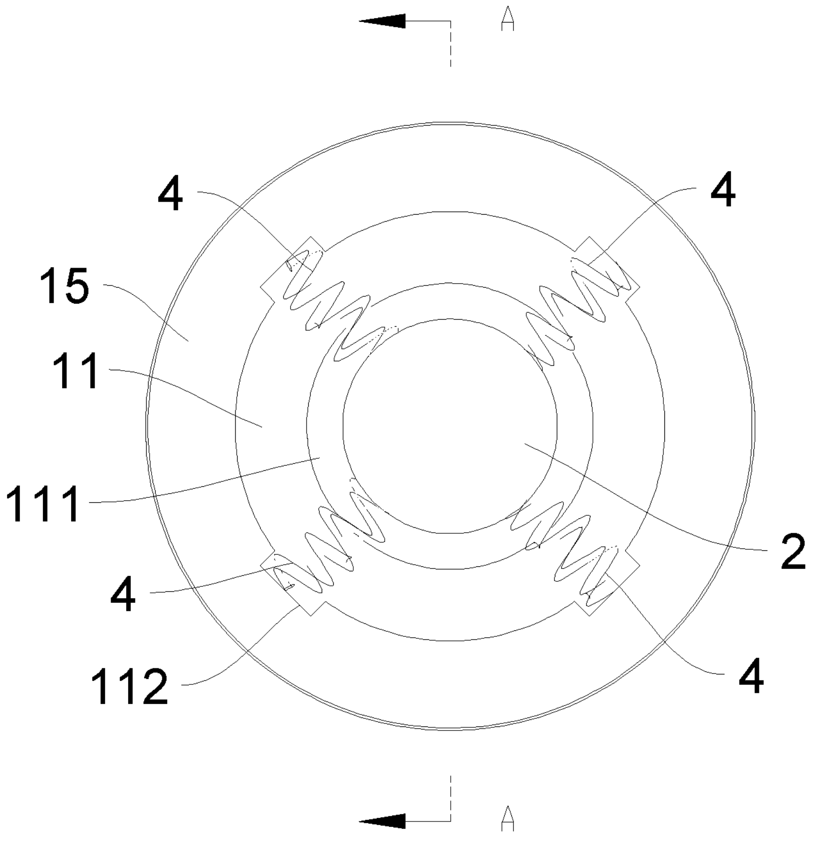
FIG. 3 is a schematic diagram of a multiple degree of freedom response valve according to an embodiment of the present disclosure viewed from front.
Figure 5:
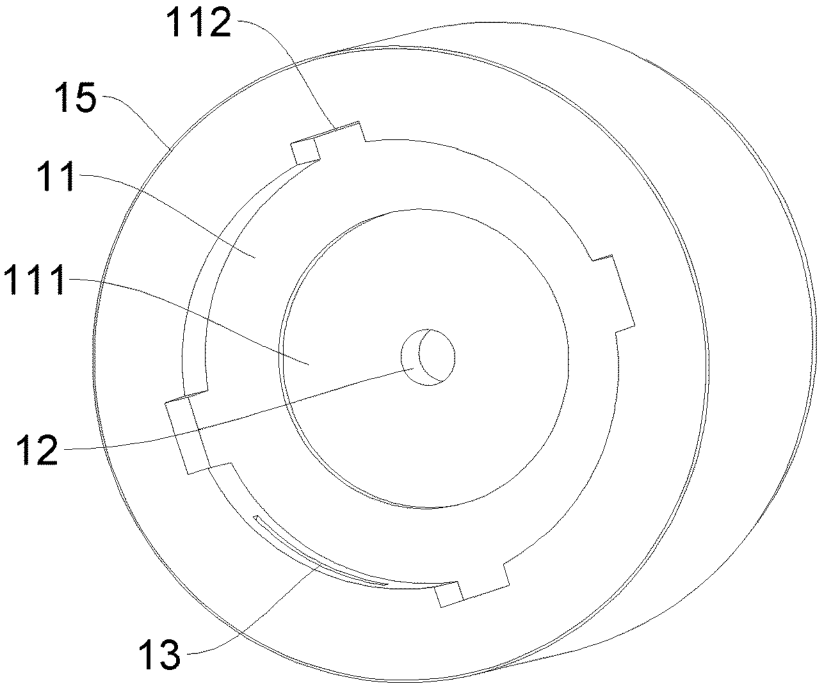
FIG. 5 is a perspective view of a valve seat according to an embodiment of the present disclosure from an angle of view.

As illustrated in FIGS. 3 and 5, in an embodiment of the present disclosure, the valve body 1 has an accommodating groove 11, and the accommodating groove 11 has a limiting groove 111 is provided at a groove bottom of the accommodating groove 11. The movable member 2 is at least partially located in the limiting groove 111. Each of the second ends of the at least three elastic members 4 is connected with a groove wall of the accommodating groove 11. A groove bottom of the limiting groove 111 has a third liquid guide hole 12, and the third liquid guide hole 12 serves as the second liquid guide channel.

The accommodating groove 11 is configured to accommodate the movable member 2. The accommodating groove 11 may be formed by recessing the valve body 1, and the accommodating groove 11 may be a circular groove. The limiting groove 111 is formed by recessing the groove bottom of the accommodating groove 11. The movable member 2 moves in the limiting groove 111, and the movable member 2 is attached to the groove bottom of the limiting groove 111, so that a maximum moving distance of the movable member 2 may be limited by the limiting groove 111. Thus, the elastic members 4 may be avoided being damaged due to excessive movement of the movable member 2.

It may be understood that when the third liquid guide hole 12 is positively aligned with the first liquid guide channel, they are in communication. When the third liquid guide hole 12 is partially staggered with the first liquid guide channel, they are in partially communicated. When the third liquid guide hole 12 is completely staggered with the first liquid guide channel, they are in a uncommunicated state, and when they are in the uncommunicated state, oil cannot flow.

In some examples, a part of the movable member 2 is located in the limiting groove 111, and the at least three elastic members 4 are connected with a part of the movable member 2 located outside the limiting groove 111.

As illustrated in FIG. 5, in an embodiment of the present disclosure, the limiting groove 111 is configured as a circular groove, and the third liquid guide hole 12 is located at an axis of the limiting groove 111. By configuring the limiting groove 111 as the circular groove, it may smoothly contact the movable member 2, avoiding a situation that the contact affects the moving position of the movable member 2. At the same time, the third liquid guide hole 12 is located at the axis of the limiting groove 111, so that the movable member 2 is located at the axis of the limiting groove 111 when the vehicle is running smoothly. Therefore, a limiting effect of the limiting groove 111 on the periphery of the movable member 2 is consistent, and free movement of the movable member 2 in the radial plane is ensured.

In some examples, the axis of the limiting groove 111 coincides with the axis of the accommodating groove 11, so that compression and elastic recovery of each elastic member 4 are consistent.

In some examples, the third liquid guide hole 12 may be a circular hole, and may also be an elongated hole in a cross-sectional shape.

Figure 7:
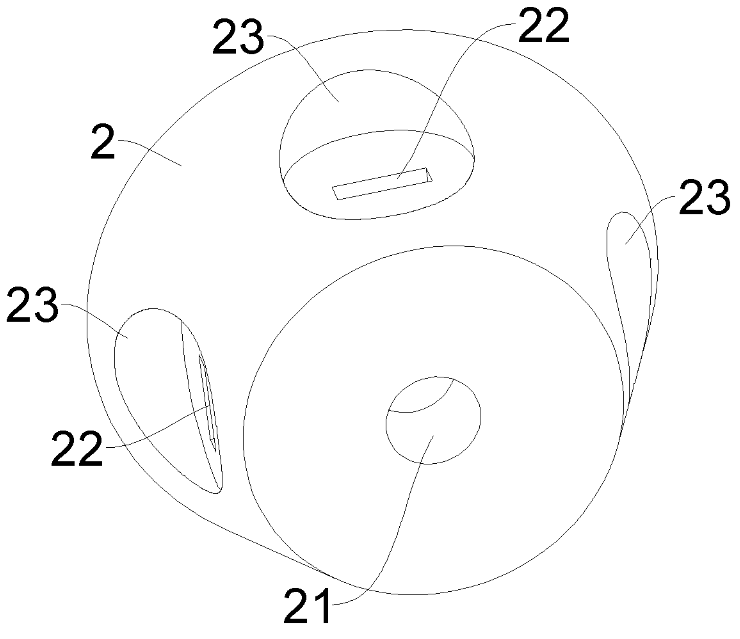
FIG. 7 is a perspective view of a movable member according to an embodiment of the present disclosure.
Figure 8:
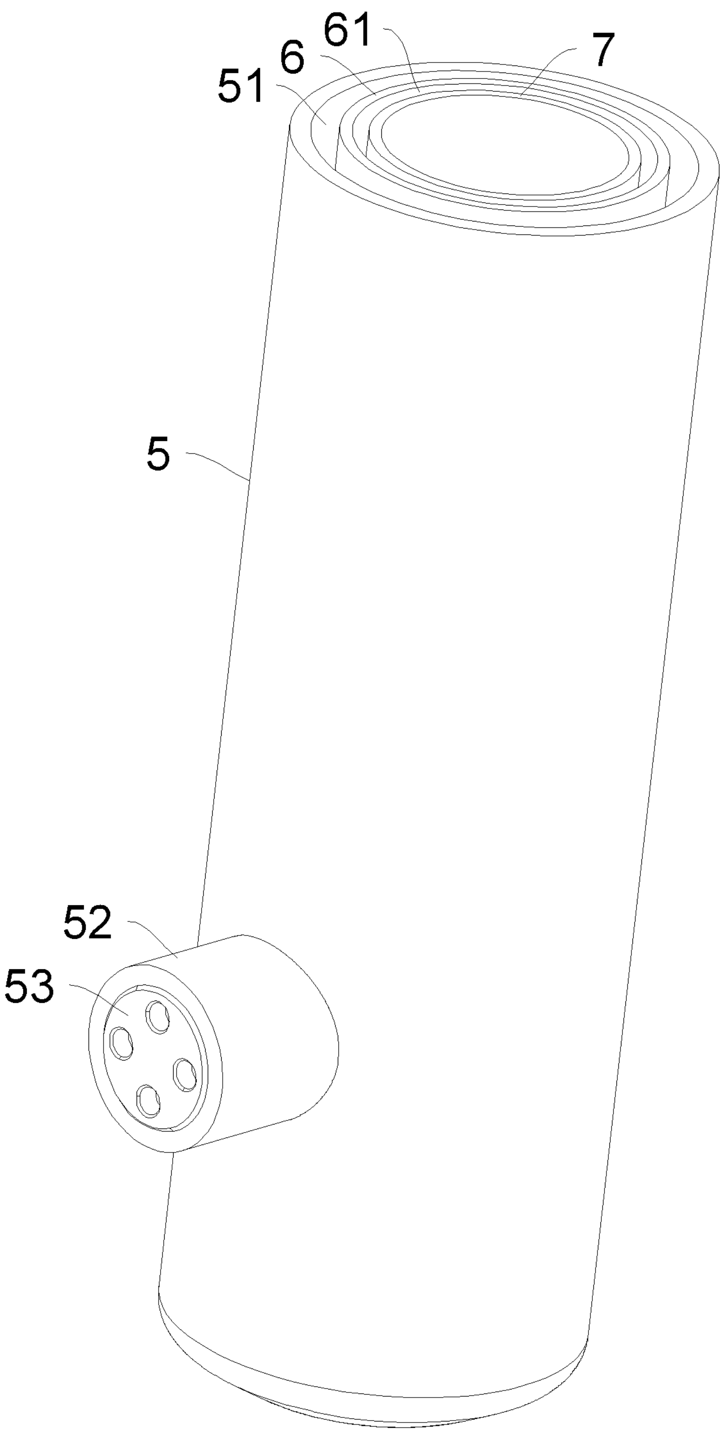
FIG. 8 is a perspective view of a variable damping shock absorber according to an embodiment of the present disclosure.

As illustrated in FIG. 7, in an embodiment of the present disclosure, the movable member 2 is configured as a movable block. The movable block may be in a cylindrical structure or a truncated cone shaped structure, which may facilitate smooth contact with the groove wall of the limiting groove 111, and make the center of gravity of the movable block located at the axis position, so that it may move freely according to dynamics of the vehicle.

Figure 6:
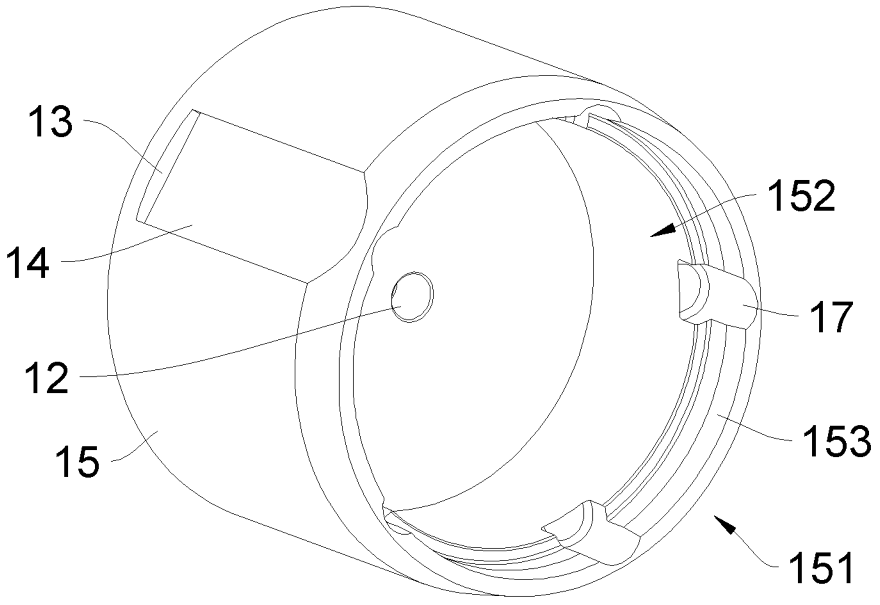
FIG. 6 is a perspective view of a valve seat according to an embodiment of the present disclosure from another angle of view.

As illustrated in FIG. 6, in an embodiment of the present disclosure, the groove wall of the accommodating groove 11 has a fourth liquid guide hole 13, and the fourth liquid guide hole 13 penetrates through the valve body 1 in a radial direction of the valve body 1. An outer side wall of the valve body 1 has a first liquid guide groove 14, and the fourth liquid guide hole 13 and the first liquid guide groove 14 together constitute the pilot channel to guide oil in the accommodating groove 11 out of the valve body 1.

The fourth liquid guide hole 13 extends in the radial direction, and the fourth liquid guide hole 13 is a through hole, so that the fourth liquid guide hole 13 communicates with the first liquid guide groove 14 located on the outer side wall of the valve body 1. The first liquid guide groove 14 extends in the axial direction of the valve body 1, and the pilot channel formed by the fourth liquid guide hole 13 and the first liquid guide groove 14 may be beneficial to guiding the oil out of the valve body 1. When the first liquid guide channel and the second liquid guide channel are communicated, the oil may be guided to the pilot channel to realize pilot flow of the oil. Thus, the multiple degree of freedom response valve may be easily switched from the off state to the on state.

In some examples, a cross-sectional shape of the fourth liquid guide hole 13 is an elongated structure, which may be better adapted to the first liquid guide groove 14. A cross-sectional shape of the fourth liquid guide hole 13 may also be circular. In some examples, the first liquid guide groove 14 is formed by recessing the outer side wall of the valve body 1 inwardly.

As illustrated in FIG. 3, in an embodiment of the present disclosure, at least three first installation grooves 112 distributed at circular intervals around an axis of the valve body 1 are on the groove wall of the accommodating groove 11, the at least three first installation grooves 112 are in one-to-one correspondence to the at least three elastic members 4, and each second end of each elastic member 4 is connected with a corresponding first installation groove 112.

The number of the first installation grooves 112 is consistent with the number of the elastic members 4, and one elastic member 4 is connected in each first installation groove 112. A direction of compression and deformation recovery of the elastic members 4 may be limited by providing the first installation grooves 112. Thus, normal compression and deformation recovery of the elastic members 4 may be ensured, the service life of the elastic members 4 may be increased, and damage to the elastic members 4 may be avoided.

In some examples, the first installation groove 112 is formed by recessing the groove wall of the accommodating groove 11 inwardly, and the second end of the elastic member 4 is connected with the groove wall of the corresponding first installation groove 112.

In some examples, the number of the elastic members 4 may be three, and the number of the elastic members 4 may also be four, five or more, which may be provided according to actual needs. A plurality of elastic members 4 may be arranged at equal intervals, and they may also be arranged at unequal intervals. Correspondingly, the number of the first installation grooves 112 may be three or more.

In an embodiment of the present disclosure, the elastic member 4 may be a spring, and the elastic member 4 may also be a metal elastic sheet or a highly elastic rubber.

As illustrated in FIG. 7, in an embodiment of the present disclosure, a surface of the movable member 2 facing the valve body 1 has a first liquid guide hole 21, a side of the movable member 2 has at least one second liquid guide hole 22, the first liquid guide hole 21 is communicated with the second liquid guide hole 22, and the first liquid guide hole 21 and the second liquid guide hole 22 together constitute the first liquid guide channel.

The first liquid guide hole 21 may communicate with the second liquid guide channel, so that the oil may flow into the second liquid guide hole 22 via the first liquid guide hole 21. The second liquid guide hole 22 communicates with the pilot channel, so that the oil may flow out of the valve body 1 via the pilot channel. By this arrangement, it is possible to facilitate the cooperation of the first liquid guide channel with the second liquid guide channel to realize the change of the communication state, and to facilitate the communication with the pilot channel.

It may be understood that, with the movement of the movable member 2, the first liquid guide hole 21 will be staggered with the second liquid guide channel. When the first liquid guide hole 21 is partially staggered with the second liquid guide channel, the first liquid guide hole 21 partially communicates with the second liquid guide channel. When the first liquid guide hole 21 is completely staggered with the second liquid guide channel, the first liquid guide hole 21 does not communicate with the second liquid guide channel.

In some examples, the first liquid guide hole 21 and the second liquid guide hole 22 are both opened inwardly from the surface of the movable member 2, and the first liquid guide hole 21 and the second liquid guide hole 22 are in communication with each other inside the movable member 2. Cross-sectional shapes of the first liquid guide hole 21 and the second liquid guide hole 22 may be elongated holes, which may better partially communicate with the second liquid guide channel and a damping adjustment range can be increased. The cross-sectional shapes of the first liquid guide hole 21 and the second liquid guide hole 22 may also be circular.

In some examples, the number of the first liquid guide holes 21 is one, and the number of the second liquid guide holes 22 is four. The four second liquid guide holes 22 are located at four sides of the movable member 2, respectively, which may facilitate the outflow of oil. The number of the second liquid guide holes 22 may also be one, which is not specifically limited.

As illustrated in FIG. 7, in an embodiment of the present disclosure, at least three second installation grooves 23 distributed at circular intervals around the axis of the movable member 2 are on the movable member 2, the at least three second installation grooves 23 are in one-to-one correspondence to the at least three elastic members 4, each elastic member 4 is connected to a corresponding second installation groove 23, respectively, and at least one second installation groove 23 is provided with the second liquid guide hole 22.

The second installation grooves 23 are configured to mount and position the elastic member 4, and the number of the second installation grooves 23 is consistent with the number of the elastic members 4.

In some examples, each second installation groove 23 is disposed opposite to each first installation groove 112 of the above-mentioned embodiment, so that each elastic member 4 is located between the first installation groove 112 and the second installation groove 23.

In some examples, the second installation groove 23 is located on the side of the movable member 2, and the second installation groove 23 is formed by recessing the side of the movable member 2 inwardly. Alternatively or additionally, the groove bottom of each second installation groove 23 has one second liquid guide hole 22, thus when the movable member 2 moves in one direction, the second liquid guide hole 22 near this direction may facilitate the discharge of the oil.

In another embodiment of the present disclosure, the axis of an end of the movable member 2 far away from the valve body 1 is provided with a connecting part, and the at least three elastic members 4 are connected with the connecting part.

Figure 2:
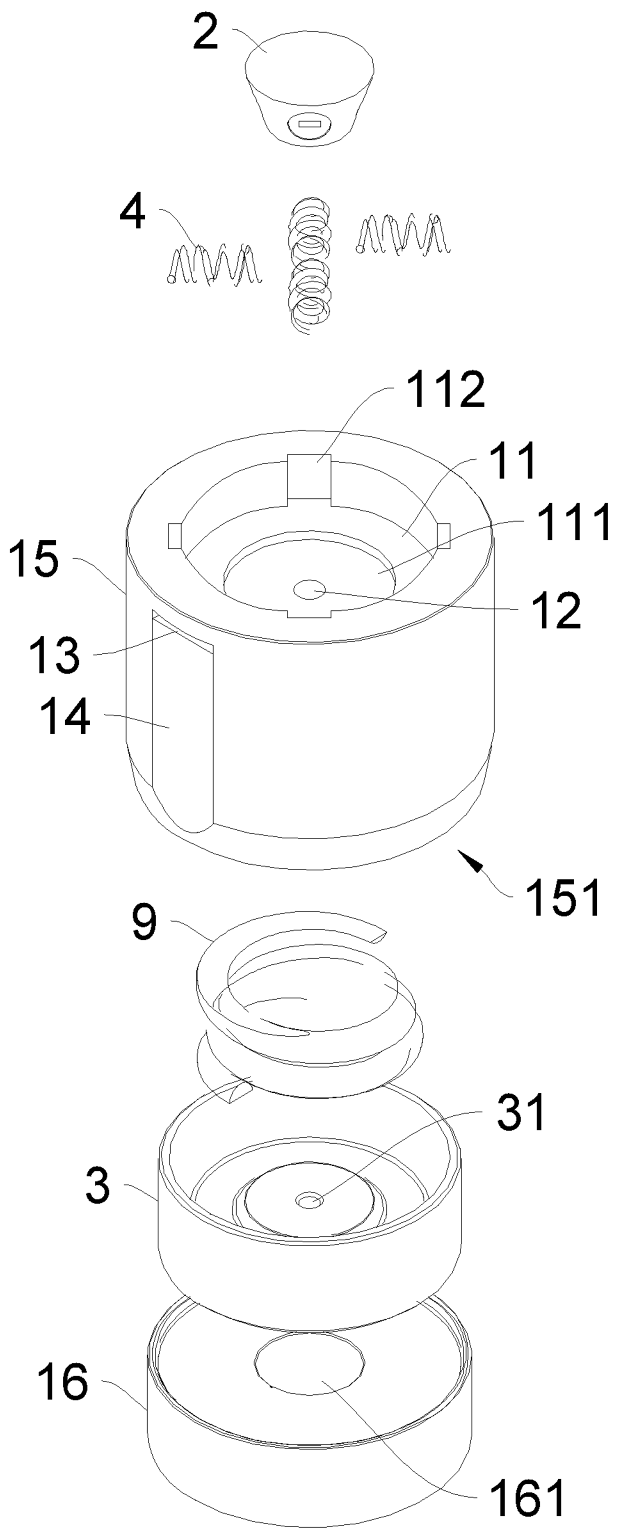
FIG. 2 is an exploded view of a multiple degree of freedom response valve according to an embodiment of the present disclosure.
Figure 4:
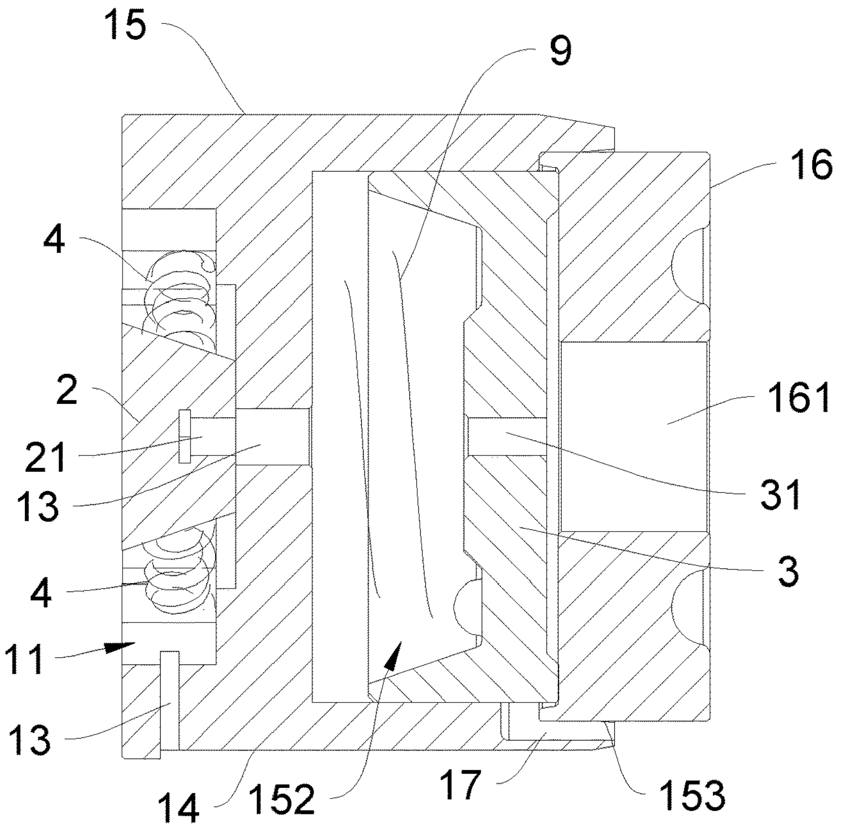
FIG. 4 is a cross-sectional view of an AA plane in FIG. 3 according to an embodiment of the present disclosure.

As illustrated in FIG. 2 and FIG. 4, in an embodiment of the present disclosure, the multiple degree of freedom response valve further includes a valve core 3 and a reset member 9. The valve body 1 has a liquid transfer channel and a liquid inlet 161, and the liquid inlet 161 is communicated with the liquid transfer channel. The valve core 3 is slidably connected to the valve body 1, a first end of the reset member 9 is connected to the valve body 1, and a second end of the reset member 9 is connected to the valve core 3. The reset member 9 is configured to drive the valve core 3 to cut off the liquid transfer channel from the liquid inlet 161, and the liquid inlet 161 is communicated with the second liquid guide channel.

The valve core 3 may slide back and forth in the valve body 1, so that the valve core 3 may cut off or communicate the liquid transfer channel with the liquid inlet 161, and correspondingly the multiple degree of freedom response valve is in the off state or the on state. The liquid inlet 161 is configured to introduce the oil, and the liquid transfer channel is configured to transport the oil and discharge the oil out of the valve body 1.

It may be understood that, when the valve core 3 cuts off the liquid transfer channel from the liquid inlet 161, the multiple degree of freedom response valve is in the off state. When the valve core 3 does not cut off the liquid transfer channel from the liquid inlet 161, the liquid transfer channel is communicated with the liquid inlet 161, and, at this time, the multiple degree of freedom response valve is in the on state and may circulate the oil.

The reset member 9 may drive the valve core 3 to move in a direction of cutting off the liquid transfer channel from the liquid inlet 161, so that the valve core 3 keeps cutting off the liquid transfer channel from the liquid inlet 161. When it is necessary to conduct the oil, it is necessary to generate a squeezing force on the valve core 3 by the pressure of the oil to overcome the reset effect of the reset member 9, so that the multiple degree of freedom response valve may be switched to the on state.

It is to be noted that, when the first liquid guide channel of the movable member 2 communicates with the second liquid guide channel of the valve body 1, the oil enters into the accommodation groove 11 via the liquid inlet 161, the second liquid guide channel and the first liquid guide channel, and then is led out of the valve body 1 via the pilot channel, which may increase a pressure difference between two sides of the valve core 3, so that the valve core 3 may overcome the reset effect of the reset member 9. The liquid transfer channel is partially cut off from the liquid inlet 161 or is not cut off from the liquid inlet 161, and, at this time, the multiple degree of freedom response valve is easier to switch from the off state to the on state. Specifically, how much pressure the oil needs to bear to overcome the reset effect of the reset member 9 may be determined according to the communication state between the first liquid guide channel and the second liquid guide channel. In other words, in case that the amount of the oil flowing through the first liquid guide channel and the second liquid guide channel is large, the oil needs to bear less pressure to overcome the reset effect of the reset member 9, and, at this time, the amount of the oil flowing through the whole multiple degree of freedom response valve is large. In case that the amount of the oil flowing through the first liquid guide channel and the second liquid guide channel is small, the oil needs to bear greater pressure to overcome the reset effect of the reset member 9, and, at this time, the amount of the oil flowing through the whole multiple degree of freedom response valve is small. Thus, the damping characteristics may be changed.

However, when the first liquid guide channel of the movable member 2 is not communicated with the second liquid guide channel of the valve body 1, the oil does not flow at all. The pressure difference between the two sides of the valve core 3 is small, and a pressure demand of the oil to overcome the reset effect of the reset member 9 is great. At this time, the multiple degree of freedom response valve is not easy to switch from the off state to the on state, and the damping characteristics are increased.

Through this arrangement, the movement of the movable member 2 may drive the valve core 3 to cooperate with the reset member 9, which may control the flow of oil and realize the adjustment of different damping characteristics of the shock absorber.

As illustrated in FIG. 6, in an embodiment of the present disclosure, the valve body 1 includes a valve seat 15 and a valve cover 16. The valve seat 15 has an accommodating cavity 152, and a valve port 151 communicated with the accommodating cavity 152 is on the valve seat 15. The valve cover 16 is covered on the valve port 151. An inner wall of the valve port 151 has a second liquid guide groove 17, and the second liquid guide groove 17 serves as the liquid transfer channel. The liquid inlet 161 is located on the valve cover 16, and the liquid inlet 161 is communicated with the liquid transfer channel through the accommodating cavity 152. The valve seat 15 has a first end distal from the valve cover 16, the movable member 2 is movably connected to the first end of the valve seat 15, and the valve core 3 and the reset member 9 are both located in the accommodating cavity 152. The first end of the reset member 9 is connected with an inner wall of the valve seat 15, and the reset member 9 is able to drive an end of the valve core 3 far away from the reset member 9 to contact with the valve cover 16 to cut off the liquid transfer channel from the liquid inlet 161.

The valve port 151 is configured to install the valve cover 16. The valve cover 16 may close the valve port 151, and the second liquid guide groove 17 is configured for the oil to flow. The accommodating cavity 152 may accommodate the valve core 3 and the reset member 9, and the accommodating cavity 152 may also accommodate the oil. It is convenient to accommodate the valve core 3 and the reset member 9 by providing the accommodating cavity 152, so as to cut off the liquid transfer channel. At the same time, the design of the valve seat 15 and the valve cover 16 may realize the disassembly and maintenance of the multiple degree of freedom response valve.

It may be understood that a main flow channel of the oil in the multiple degree of freedom response valve is the liquid inlet 161, the accommodating cavity 152, and the liquid transfer channel. The end of the valve core 3 far away from the reset member 9 may contact with the valve cover 16. When the valve core 3 contacts with the valve cover 16 under the action of the reset member 9, the valve core 3 may close an end of the second liquid guide groove 17 communicating with the accommodating cavity 152. At this time, the oil in the accommodating cavity 152 cannot enter the second liquid guide groove 17. Thus, the multiple degree of freedom response valve is in the off state. When the valve core 3 is separated from the valve cover 16 by overcoming the action of the reset member 9, the second liquid guide groove 17 communicates with the accommodating cavity 152. At this time, the oil in the accommodating cavity 152 may enter the second liquid guide groove 17. Thus, the multiple degree of freedom response valve is in the on state.

In some examples, the reset member 9 may be a spring, and the spring may be compressed to produce deformation. In some examples, the valve seat 15 is constructed as a cylindrical structure, the valve seat has a second end opposite the first end, and the valve port 151 is located at the second end of the valve seat 15. The valve cover 16 is constructed as a disc-shaped structure. A surface of the valve cover 16 covers an end of the valve port 151 of the valve seat 15, and from the first end of the valve seat 15 is provided with the accommodating groove 11, and the third liquid guide hole 12 penetrates through the groove bottom of the accommodating groove 11 and communicates with the accommodating cavity 152. Thus, the oil in the accommodating cavity 152 may flow into the first liquid guide hole 21 in the above-mentioned embodiment.

In some examples, the valve core 3 is constructed as a cylindrical structure, and the first end of the valve core 3 is configured as an open structure. The first end of the valve core 3 is snap-fitted into the valve seat 15, so that the valve core 3 is entirely slidably disposed in the valve seat 15. The second end of the valve core 3 is configured to contact with the valve cover 16, and the second end of the reset member 9 extends into the valve core 3 and is connected with the valve core 3. A communicating hole 31 is formed at the second end of the valve core 3, and the communicating hole 31 is configured to communicate the liquid inlet 161 with the accommodating cavity 152, so that the liquid inlet 161 may communicate with the third liquid guide hole 12, and pilot overflow of the oil is enabled, to facilitate the valve core 3 to overcome the reset effect of the reset member 9.

The accommodating groove 11, the third liquid guide hole 12, the fourth liquid guide hole 13 and the first liquid guide groove 14 in the above-mentioned embodiment are all located on the valve seat 15.

As illustrated in FIG. 6, in an embodiment of the present disclosure, an inner side wall of the valve port 151 has a snapping groove 153, and the snapping groove 153 is annularly disposed along a circumferential edge of the valve port 151. The valve cover 16 is snap-fitted in the snapping groove 153, and a part of the second liquid guide groove 17 is located on a groove wall of the snapping groove 153. By providing the snapping groove 153, a connection strength between the valve cover 16 and the valve seat 15 may be improved, making the two more adaptable.

It is to be noted that, a part of the second liquid guide groove 17 is located on the groove wall of the snapping groove 153, and the other part is located on the inner side wall of the valve seat 15. In some examples, the number of the second liquid guide grooves 17 may be one, or multiple. The multiple second liquid guide grooves 17 are annularly disposed around the axis of the valve seat 15.

As illustrated in FIGS. 8 to 11, a second aspect of the present disclosure also provides a variable damping shock absorber. The variable damping shock absorber includes a shock absorber body and the above-mentioned multiple degree of freedom response valve, and the multiple degree of freedom response valve is connected to the shock absorber body.

Figure 9:
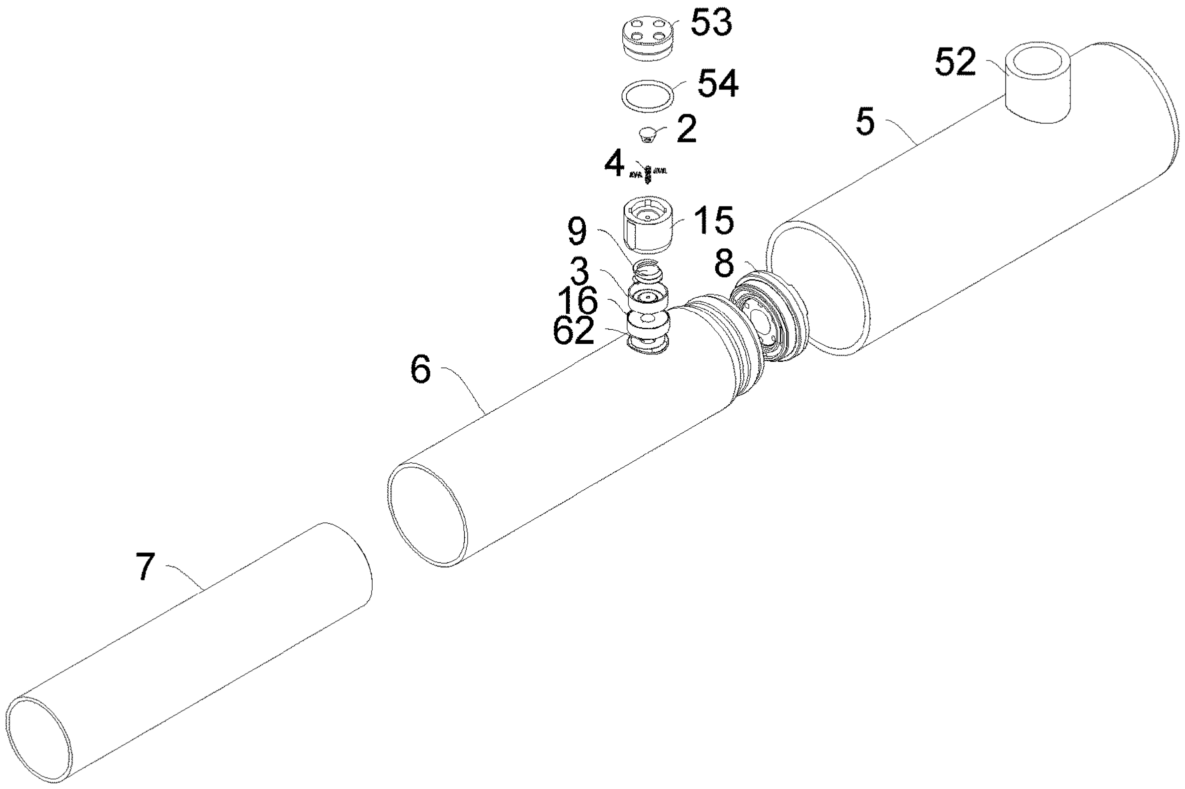
FIG. 9 is an exploded view of a variable damping damper according to an embodiment of the present disclosure.
Figure 10:
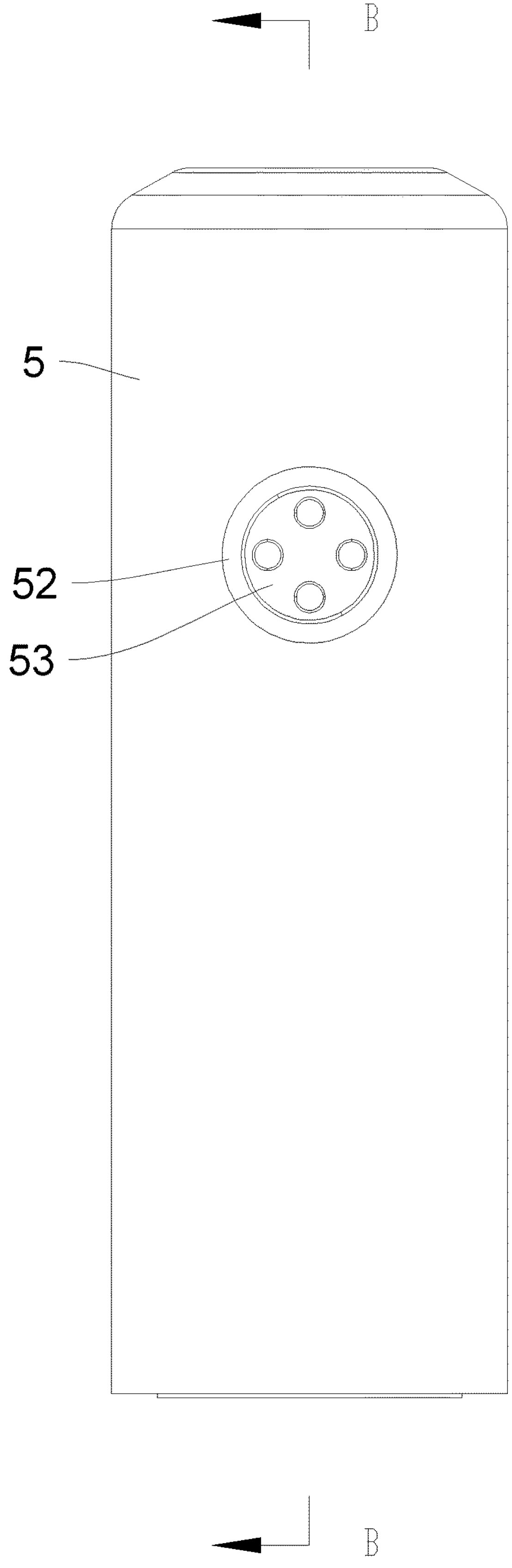
FIG. 10 is a schematic diagram of a variable damping shock absorber in a forward direction according to an embodiment of the present disclosure.

As illustrated in FIG. 9, in an embodiment of the present disclosure, the shock absorber body includes a first cylinder 5, a second cylinder 6, a third cylinder 7, and a foot valve 8. The second cylinder 6 is connected in the first cylinder 5, and the third cylinder 7 is connected in the second cylinder 6. A first chamber 51 is defined between the first cylinder 5 and the second cylinder 6, and a second chamber 61 is defined between the second cylinder 6 and the third cylinder 7. A through hole 62 is provided on the second cylinder 6, and the through hole 62 is communicated with the second chamber 61. A valve body 1 of the multiple degree of freedom response valve is connected to the second cylinder 6, the valve body 1 is communicated with the through hole 62 and the first chamber 51 separately, and a pilot channel is communicated with the first chamber 51.

The first cylinder 5 serves as an oil storage cylinder, the second cylinder 6 serves as an intermediate cylinder, and the third cylinder 7 serves as a working cylinder. A three-cylinder structure is formed by the first cylinder 5, the second cylinder 6, and the third cylinder 7. The foot valve 8 is a common passive valve system structure. It is to be noted that a piston valve system is also fitted in the third cylinder 7, thus forming a complete hydraulic circuit.

The valve cover 16 in the above-mentioned embodiment is connected with an outer wall of the second cylinder 6, the liquid inlet 161 communicates with the through hole 62, so that the second chamber 61 communicates with the liquid inlet 161 for introducing the oil in the second chamber 61 into the valve body 1. The liquid transfer channel in the above-mentioned embodiment communicates with the first chamber 51, so that the oil in the valve body 1 may be led out into the first chamber 51. The pilot channel communicates with the first chamber 51, so that a part of the oil may pilot overflow to the first chamber 51, and the pressure difference between the two sides of the valve core 3, that is, a pressure difference between the accommodation cavity 152 and the liquid inlet 161, may be changed, so that the valve core 3 may overcome the reset effect of the reset member 9 to realize movement, and the liquid inlet 161 is communicated with the liquid transfer channel.

Figure 11:
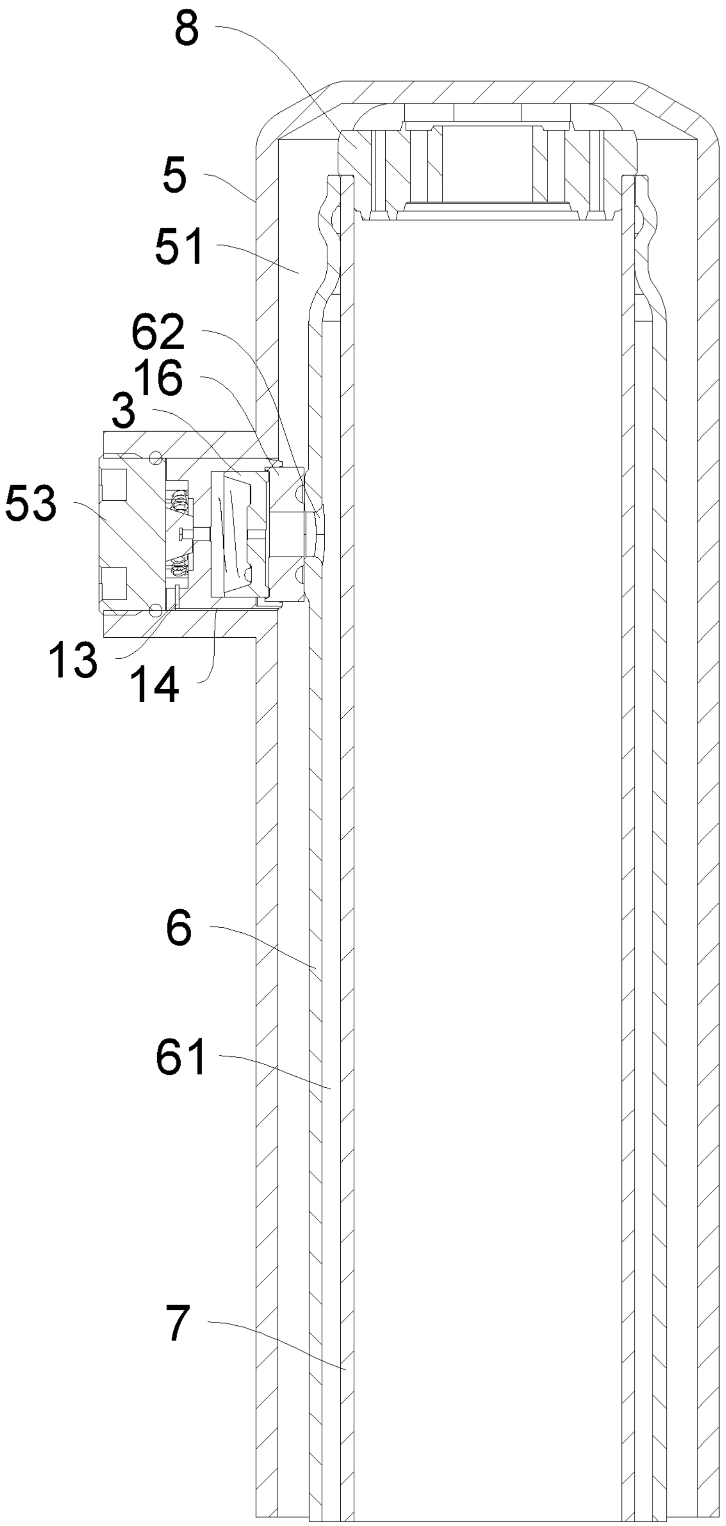
FIG. 11 is a cross-sectional view of a BB plane in FIG. 10 according to an embodiment of the present disclosure.

As illustrated in FIGS. 9 and 11, in an embodiment of the present disclosure, a mounting seat 52 is formed on the first cylinder 5, and the valve body 1 is connected to the mounting seat 52. A sealing cover 53 is provided on the mounting seat 52, the sealing cover 53 is disposed on the valve body 1, and the sealing cover 53 is detachably connected with the mounting seat 53.

The multiple degree of freedom response valve may be installed and fixed by providing the mounting seat 52, so that the valve cover 16 of the multiple degree of freedom response valve may be connected with the second cylinder 6. At the same time, the multiple degree of freedom response valve may be maintained by disassembling the sealing cover 53.

In some examples, an end of the mounting seat 52 far away from the first cylinder 5 is provided with a mounting opening. The multiple degree of freedom response valve is assembled in the mounting seat 52 via the mounting opening, and the sealing cover 53 is covered on the mounting opening, and the sealing cover 53 may be detached from the mounting seat 52. The sealing cover 53 may be screwed to the mounting seat 52, and may also be bolted.

In some examples, a sealing ring 54 may be disposed between the sealing cover 53 and the mounting seat 52 to realize sealing, or an interference fit may be employed to realize sealing.

It is to be noted that the stiffness and pre-tightening force of the elastic member 4, the stiffness and pre-tightening force of the reset member 9, the size of the valve core 3, the size of the first liquid guide channel, the size of the second liquid guide channel, the size of the movable member 2, and the like may be adjusted according to an actual situation to meet different needs of different vehicles.

A third aspect of the present disclosure also provides a vehicle. The vehicle includes the above-mentioned multiple degree of freedom response valve, or the above-mentioned variable damping damper.

The movable member 2 may move freely in a radial plane, so that the movable member 2 may move according to different states such as acceleration, deceleration, left-right roll, and simultaneous acceleration and roll, simultaneous deceleration and roll, and the like as the vehicle advances. Thus, adjustment of damping characteristics of the shock absorber may be realized.

In addition, when the entire variable damping shock absorber is tilted, the radial plane where the movable member 2 is movable freely is at an angle to the horizontal plane, which may better adapt to acceleration changes in a front and rear direction, a left and right direction, and a up and down direction of the vehicle, and realize the adjustment of the damping characteristics of the shock absorber. For example, when the vehicle slowly changes lanes in the left and right direction, the movable member 2 may more keenly sense a lateral movement of the vehicle in the left and right direction, and may gradually adjust the damping characteristics of the shock absorber according to a lane change situation of the vehicle to maintain the stability of the vehicle body.

A first aspect of the present disclosure provides a multiple degree of freedom response valve. The multiple degree of freedom response valve includes a valve body, a movable member, and at least three elastic members. The movable member is movably connected to the valve body, the at least three elastic members are disposed at intervals around an axis of the movable member and connected to the movable member, the at least three elastic members are in a same plane in a radial direction of the movable member, ends of the at least three elastic members far away from the movable member are connected with the valve body, a first liquid guide channel is provided on the movable member, a second liquid guide channel and a pilot channel are provided on the valve body, the pilot channel is communicated with the first liquid guide channel, and the movable member is able to move on the valve body, so that the first liquid guide channel and the second liquid guide channel are able to be communicated or uncommunicated. The multiple degree of freedom response valve has an on state and an off state, and the multiple degree of freedom response valve is easier to switch from the off state to the on state when the first liquid guide channel and the second liquid guide channel are at least partially communicated, compared to when the first liquid guide channel and the second liquid guide channel are not communicated.

In some examples, an accommodating groove is provided on the valve body, a limiting groove is provided at a groove bottom of the accommodating groove, the movable member is at least partially located in the limiting groove, the ends of the at least three elastic members far away from the movable member are connected with a groove wall of the accommodating groove, a groove bottom of the limiting groove is provided with a third liquid guide hole, and the third liquid guide hole serves as the second liquid guide channel.

In some examples, the limiting groove is configured as a circular groove, and the third liquid guide hole is located at an axis of the limiting groove.

In some examples, the groove wall of the accommodating groove is provided with a fourth liquid guide hole, the fourth liquid guide hole penetrates through the valve body in a radial direction of the valve body, an outer side wall of the valve body is provided with a first liquid guide groove, and the fourth liquid guide hole and the first liquid guide groove together constitute the pilot channel to guide oil in the accommodating groove out of the valve body.

In some examples, at least three first installation grooves distributed at circular intervals around an axis of the valve body are provided on the groove wall of the accommodating groove, each first installation groove is in one-to-one correspondence to each elastic member, and an end of each elastic member far away from the movable member is connected with a corresponding first installation groove.

In some examples, a surface of the movable member facing the valve body is provided with a first liquid guide hole, a side of the movable member is provided with at least one second liquid guide hole, the first liquid guide hole is communicated with the second liquid guide hole, and the first liquid guide hole and the second liquid guide hole together constitute the first liquid guide channel.

In some examples, at least three second installation grooves distributed at circular intervals around the axis of the movable member are provided on the movable member, each second installation groove is in one-to-one correspondence to each elastic member, each elastic member is connected to a corresponding second installation groove, and at least one second installation groove is provided with the second liquid guide hole.

In some examples, the multiple degree of freedom response valve further includes a valve core and a reset member, in which the valve body is provided with an liquid transfer channel and a liquid inlet, the liquid inlet is communicated with the liquid transfer channel, the valve core is slidably connected to the valve body, a first end of the reset member is connected to the valve body, a second end of the reset member is connected to the valve core, the reset member is configured to drive the valve core to cut off the liquid transfer channel from the liquid inlet, and the liquid inlet is communicated with the second liquid guide channel.

In some examples, the valve body includes a valve seat and a valve cover, in which the valve seat has an accommodating cavity, a valve port communicated with the accommodating cavity is provided on the valve seat, the valve cover is covered on the valve port, a second liquid guide groove is formed on an inner wall of the valve port, the second liquid guide groove serves as the liquid transfer channel, the liquid inlet is located on the valve cover, the liquid inlet is communicated with the liquid transfer channel through the accommodating cavity, the movable member is movably connected to an end of the valve seat far away from the valve cover, the valve core and the reset member are located in the accommodating cavity, the first end of the reset member is connected with an inner wall of the valve seat, and the reset member is able to drive an end of the valve core far away from the reset member to contact with the valve cover to cut off the liquid transfer channel from the liquid inlet.

In some examples, a snapping groove is formed on an inner side wall of the valve port, the snapping groove is annularly disposed along a circumferential edge of the valve port, the valve cover is snap-fitted in the snapping groove, and a part of the second liquid guide groove is located in a groove wall of the snapping groove.

A second aspect of the present disclosure also provides a variable damping shock absorber. The variable damping shock absorber includes a shock absorber body and the above-mentioned multiple degree of freedom response valve, in which the multiple degree of freedom response valve is connected to the shock absorber body.

In some examples, the shock absorber body includes a first cylinder, a second cylinder, a third cylinder, and a foot valve, in which the second cylinder is connected in the first cylinder, the third cylinder is connected in the second cylinder, a first chamber is defined between the first cylinder and the second cylinder, a second chamber is defined between the second cylinder and the third cylinder, the second cylinder has a through hole, the through hole is communicated with the second chamber, a valve body of the multiple degree of freedom response valve is connected to the second cylinder, the valve body is communicated with the through hole and the first chamber separately, and a pilot channel is communicated with the first chamber.

In some examples, a mounting seat is formed on the first cylinder, the valve body is connected to the mounting seat, a sealing cover is covered on the mounting seat, the sealing cover is disposed on the valve body, and the sealing cover is detachably connected with the mounting seat.

A third aspect of the present disclosure also provides a vehicle. The vehicle includes the above-mentioned multiple degree of freedom response valve, or the above-mentioned variable damping damper.

Preferred embodiments of the present disclosure is described in detail in combination with the accompanying drawings above, but the present disclosure is not limited to the specific details in the above-mentioned embodiments. Within the scope of the technical conception of the present disclosure, various simple modifications may be made to the technical solution of the present disclosure, and these simple modifications all belong to the protection scope of the present disclosure.

In addition, it is to be noted that specific technical features described in the above-mentioned specific embodiments may be combined in any suitable way without contradiction, and in order to avoid unnecessary repetition, the present disclosure does not specify the various possible combinations.

In addition, any combination of the various embodiments of the present disclosure may also be made without departing from the spirit of the present disclosure, which should likewise be construed as the present disclosure.

What is claimed is:

1. A multiple degree of freedom response valve, comprising:

a valve body;

a movable member movably connected to the valve body, the moveable member having a first liquid guide channel, the valve body having a second liquid guide channel and a pilot channel; and at least three elastic members disposed at intervals around an axis of the movable member and each connected at a first end to the movable member and a second end opposite the first end to the valve body, wherein:

the at least three elastic members are in a same plane in a radial direction of the movable member, the pilot channel is communicated with the first liquid guide channel, and the movable member is movable with respect to the valve body, so that the first liquid guide channel and the second liquid guide channel are able to be communicated or uncommunicated; and wherein the multiple degree of freedom response valve has an on state and an off state, and the multiple degree of freedom response valve is easier to switch from the off state to the on state when the first liquid guide channel and the second liquid guide channel are at least partially communicated, compared to when the first liquid guide channel and the second liquid guide channel are not communicated.

2. The multiple degree of freedom response valve of claim 1, the valve body further having an accommodating groove, the accommodating groove having a limiting groove in a groove bottom of the accommodating groove, the movable member being at least partially located in the limiting groove, each of the second ends of the at least three elastic members being connected with a groove wall of the accommodating groove, a groove bottom of the limiting groove having a third liquid guide hole, and the third liquid guide hole serving as the second liquid guide channel.

3. The multiple degree of freedom response valve of claim 2, wherein the limiting groove is configured as a circular groove, and the third liquid guide hole is located at an axis of the limiting groove.

4. The multiple degree of freedom response valve of claim 2, the groove wall of the accommodating groove having a fourth liquid guide hole that penetrates through the valve body in a radial direction of the valve body;

an outer side wall of the valve body having a first liquid guide groove;

wherein the fourth liquid guide hole and the first liquid guide groove together constitute the pilot channel to guide oil in the accommodating groove out of the valve body.

5. The multiple degree of freedom response valve of claim 2, wherein at least three first installation grooves distributed at circular intervals around an axis of the valve body are on the groove wall of the accommodating groove, the at least three first installation grooves are in one-to-one correspondence to the at least three elastic members, and each second end of each elastic member is connected with a corresponding first installation groove.

6. The multiple degree of freedom response valve of claim 2, wherein the at least three elastic members are connected to a part of the movable member outside the limiting groove.

7. The multiple degree of freedom response valve of claim 2, wherein an axis of the limiting groove coincides with an axis of the accommodating groove.

8. The multiple degree of freedom response valve of claim 1, wherein a surface of the movable member facing the valve body has a first liquid guide hole, a side of the movable member has at least one second liquid guide hole, the first liquid guide hole is communicated with the at least one second liquid guide hole, and the first liquid guide hole and the at least one second liquid guide hole together constitute the first liquid guide channel.

9. The multiple degree of freedom response valve of claim 8, wherein at least three second installation grooves distributed at circular intervals around the axis of the movable member are provided on the movable member, the at least three second installation grooves are in one-to-one correspondence to the at least three elastic members, each elastic member is connected to a corresponding second installation groove, and at least one second installation groove has the second liquid guide hole.

10. The multiple degree of freedom response valve of claim 2, further comprising a valve core and a reset member, the valve body having a liquid transfer channel and a liquid inlet, wherein the liquid inlet is communicated with the liquid transfer channel, the valve core is slidably connected to the valve body, the reset member has a first end connected to the valve body and a second end connected to the valve core, the reset member is configured to drive the valve core to cut off the liquid transfer channel from the liquid inlet, and the liquid inlet is communicated with the second liquid guide channel.

11. The multiple degree of freedom response valve of claim 10, wherein the valve body comprises a valve seat and a valve cover, wherein the valve seat has an accommodating cavity, a valve port communicated with the accommodating cavity is on the valve seat, the valve cover is covered on the valve port, an inner wall of the valve port has a second liquid guide groove, the second liquid guide groove serves as the liquid transfer channel, the liquid inlet is located on the valve cover, the liquid inlet is communicated with the liquid transfer channel through the accommodating cavity, the valve seat having a first end distal from the valve cover, the movable member is movably connected to the first end of the valve seat, the valve core and the reset member are located in the accommodating cavity, the first end of the reset member is connected with an inner wall of the valve seat, and the reset member is able to drive an end of the valve core far away from the reset member to contact with the valve cover to cut off the liquid transfer channel from the liquid inlet.

12. The multiple degree of freedom response valve of claim 11, wherein a snapping groove is formed in an inner side wall of the valve port, the snapping groove is annularly disposed along a circumferential edge of the valve port, the valve cover is snap-fitted in the snapping groove, and a part of the second liquid guide groove is located in a groove wall of the snapping groove.

13. The multiple degree of freedom response valve of claim 12, wherein a part of the second liquid guide groove is located on the groove wall of the snapping groove, and the other part is located on an inner side wall of the valve seat.

14. The multiple degree of freedom response valve of claim 11, wherein the valve seat is constructed as a cylindrical structure, the valve seat has a second end opposite the first end, and the valve port is located at the second end of the valve seat; the valve cover is constructed as a disc-shaped structure, a surface of the valve cover covers an end of the valve port of the valve seat, and from the first end of the valve seat is provided with the accommodating groove, and the third liquid guide hole penetrates through a groove bottom of the accommodating groove and communicates with the accommodating cavity.

15. The multiple degree of freedom response valve of claim 11, the valve core is constructed as a cylindrical structure, a first end of the valve core is configured as an open structure, the first end of the valve core is snap-fitted into the valve seat, and the valve core is entirely slidably disposed in the valve seat; a second end of the valve core is configured to contact with the valve cover, and the second end of the reset member extends into the valve core and is connected with the valve core; a communicating hole is formed at the second end of the valve core, and the communicating hole is configured to communicate the liquid inlet with the accommodating cavity.

16. A variable damping shock absorber, comprising:

a shock absorber body; and a multiple degree of freedom response valve connected to the shock absorber body, and the multiple degree of freedom response valve comprising:

a valve body;

a movable member movably connected to the valve body, the moveable member having a first liquid guide channel, the valve body having a second liquid guide channel and a pilot channel; and at least three elastic members disposed at intervals around an axis of the movable member and each connected at a first end to the movable member and a second end opposite the first end to the valve body, wherein:

the at least three elastic members are in a same plane in a radial direction of the movable member, the pilot channel is communicated with the first liquid guide channel, and the movable member is movable with respect to the valve body, so that the first liquid guide channel and the second liquid guide channel are able to be communicated or uncommunicated; and wherein the multiple degree of freedom response valve has an on state and an off state, and the multiple degree of freedom response valve is easier to switch from the off state to the on state when the first liquid guide channel and the second liquid guide channel are at least partially communicated, compared to when the first liquid guide channel and the second liquid guide channel are not communicated.

17. The variable damping shock absorber of claim 16, wherein the shock absorber body comprises a first cylinder, a second cylinder, a third cylinder, and a foot valve, wherein the second cylinder is connected in the first cylinder, the third cylinder is connected in the second cylinder, a first chamber is defined between the first cylinder and the second cylinder, a second chamber is defined between the second cylinder and the third cylinder, the second cylinder has a through hole, the through hole is communicated with the second chamber, thea valve body of the multiple degree of freedom response valve is connected to the second cylinder, the valve body is communicated with the through hole and the first chamber separately, and a pilot channel is communicated with the first chamber.

18. The variable damping shock absorber of claim 17, wherein a mounting seat is formed on the first cylinder, the valve body is connected to the mounting seat, a sealing cover is provided on the mounting seat, the sealing cover is covered on the valve body, and the sealing cover is detachably connected with the mounting seat.

19. The variable damping shock absorber of claim 18, wherein a sealing ring is disposed between the sealing cover and the mounting seat.

20. A vehicle comprising:

a multiple degree of freedom response valve comprising:

a valve body;

a movable member movably connected to the valve body, the moveable member having a first liquid guide channel, the valve body having a second liquid guide channel and a pilot channel; and at least three elastic members disposed at intervals around an axis of the movable member and each connected at a first end to the movable member and a second end opposite the first end to the valve body, wherein:

the at least three elastic members are in a same plane in a radial direction of the movable member, the pilot channel is communicated with the first liquid guide channel, and the movable member is movable with respect to the valve body, so that the first liquid guide channel and the second liquid guide channel are able to be communicated or uncommunicated; and wherein the multiple degree of freedom response valve has an on state and an off state, and the multiple degree of freedom response valve is easier to switch from the off state to the on state when the first liquid guide channel and the second liquid guide channel are at least partially communicated, compared to when the first liquid guide channel and the second liquid guide channel are not communicated.

* * * * *